United States Patent [19]

Eberhard et al.

[11] Patent Number: 5,019,267

[45] Date of Patent: May 28, 1991

[54] PROCESS FOR MESOPHILIC OR THERMOPHILIC AEROBICO-ENZYMIC CONDITIONING OF LIQUID ORGANIC SUBSTANCES AND BIOMASS

[75] Inventors: Friedrich Eberhard, Dresden; Gottfried Schramm, Berlin; Ulrich Holesovsky, Halle; Peter Richardt, Halle-Neustadt; Steffen Ehrig, Dresden; Karin Jobst, Radebeul; Hans-Jürgen Blobel; Friedrich Kutzsche, both of Dresden; Gerda Koschade, Freital; Hannelore Friedrich, Dresden; Rolf Nitzsche, Kirschau, all of German Democratic Rep.

[73] Assignee: Prowatec GmbH Halle, Halle, German Democratic Rep.

[21] Appl. No.: 395,619

[22] Filed: Aug. 18, 1989

[30] Foreign Application Priority Data

Sep. 14, 1988 [DD] German Democratic Rep. .................................... 3197856

[51] Int. Cl.$^5$ .......................... C02F 3/02; C02F 11/14
[52] U.S. Cl. .................................... 210/606; 210/609; 210/620; 210/632; 210/908; 210/631
[58] Field of Search ............... 210/606, 609, 631, 632, 210/612, 613, 908–910, 620

[56] References Cited

U.S. PATENT DOCUMENTS

| | | | |
|---|---|---|---|
| 3,801,499 | 4/1974 | Luck | 210/606 |
| 4,119,491 | 10/1978 | Wellington | 210/606 X |
| 4,132,638 | 1/1979 | Carlsson | 210/606 |
| 4,623,465 | 11/1986 | Klibanov | 210/632 |

FOREIGN PATENT DOCUMENTS

| | | | |
|---|---|---|---|
| 54-123247 | 9/1979 | Japan | 210/609 |
| 63-116800 | 5/1988 | Japan | 210/606 |

*Primary Examiner*—Tom Wyse
*Attorney, Agent, or Firm*—Schweitzer Cornman & Gross

[57] ABSTRACT

The invention relates to the conditioning of liquid organic substances and biomass, particularly of municipal sewage sludge, with the help of chelating agents and enzymes, by breaking the organic substance down in an aerobic-conditioning reactor by addition of chelating agents and enzymes, this is discontinued prior to the complete dissolution of the organic matter after a time period of 0.5 to 20 hours. The mixture of substances is then subjected to an open-top non-aerated postreaction phase of 5 to 15 hours during which biogenous flocculation takes place. A solid-liquid separation follows.

8 Claims, No Drawings

PROCESS FOR MESOPHILIC OR THERMOPHILIC AEROBICO-ENZYMIC CONDITIONING OF LIQUID ORGANIC SUBSTANCES AND BIOMASS

FIELD OF THE INVENTION

This invention relates to the conditioning of liquid organic substances, particularly of municipal sewage sludge and the like, with the help of chelating agents and enzymes.

BACKGROUND OF THE INVENTION

Sludge treatment processes using enzymes have been known for a number of years to permit a significant shortening of stabilization periods as compared to conventional processes. The patent literature describes various processes relating the degradation of organic matter by the use of a quantity of enzymes depending on the mass of dry matter in the sludge. The known enzymatic processes aim at an as rapid as possible degradation of the activated sludge into a stabilized form. Herein, small quantities of added enzymes are intended to bring about high degradation rates and also a favorable impact on the dewatering characteristics of enzymatically treated sludge.

In a process according to British Pat. No. 1,563,335, 0.001 to 15% of finely comminuted dry matter, dry enzymes in a quantity of up to 5% based on dry matter, and thermophilic microorganisms are fed into a reaction vessel and are aerated, while the sludge is continuously maintained at a temperature of from 50° to 70° C.

German Federal Republic Pat. No. 2,633,514 relates to a process for increasing the filterability and the capacity of sedimentation of suspensions, wherein an enzyme or a group of enzymes is added to the suspension under agitation.

U.S. Pat. No. 4,267,049 describes the transformation of treated sludge into reusable substances by hydrolysis of the organic matter in the sludge with the addition to the sludge of at least one hydrolytic enzyme, and microorganisms producing hydrolytic enzymes, by leaving at least one sludge to itself with enzymes or microorganisms, and by subsequent separation of the suspension into an effluent and a moist product.

In German Democratic Republic Pat. No. 234,571 there is disclosed a process wherein the organic matter to be enzymatically treated and the biomass are fed into a reaction medium containing, depending on the kind and composition of the organic matter or the kind of biomass to be treated, 0.01 to 1% wt., based on the mass of organic dry matter, of added hydrolytic enzymes, and 0.005 to 0.5% wt. of a chelating agent, at a temperature of 30° to 60° C.

The reaction medium is a watery solution of already enzymatically treated organic substances, such as sewage sludge or liquid manure, or activated sludge biomass, or microorganism cultures.

Upon introduction of the organic substances, including biomass into this reaction medium, the hydrolytic enzymes present start a quick hydrolytic degradation of organic macromolecules such as carbohydrate, proteins, fats contained in the organic substance including biomass, into microbially easily degradable low-molecular weight compounds, such as sugars, and organic acids. The latter compounds are immediately available for disposal by the microorganisms added as biomass or in other organic substances added to the reaction medium, thus stimulating the biochemical activity of the microorganisms. The chelating agent contained in the reaction medium has an impact on the metabolism of the microorganisms insofaras it triggers by its permeability increasing effect, a strong one-sided promotion of their respiration, and accelerates the exchange of substances through their cell walls.

The temperature shift is caused by the sudden supply of the organic substances including biomass having at least 10° C. lower temperature into the reaction medium that is at 30° to 60° C. This triggers an intensified release of exoenzymes by microorganisms into the reaction medium as well as processes of autolysis and sporulation of microorganisms. The joint effect of hydrolytic enzymes, the chelating agent and the temperature shift leads to a quick degradation of biodegradable substances and biomass and to an intensified exchange of substances across the cell walls of the microorganism as well as to a higher production of metabolites such as enzymes, vitamins, organic acids, antibiotics, etc.

Apart from natural dewatering, centrifugal dehydration as one method of mechanical dehydration is known to be applied to sewage sludge. Considerable quantities of polymeric flocculants are required to obtain a relatively high solids concentration in the output of centrifuges and a minimal concentrate concentration.

Up to now, evidence on the dewatering behavior could be only obtained by expensive large-scale dehydration tests. The so far stated laboratory parameters, such as head loss, CST have only permitted limited assessment of the dewatering behavior. Granulometric measurements and recording of the surface potential, however, have led to conditions which permit assessment of the result of dewatering.

The use of expensive flocculants frequently does not lead to a dry matter content of the output that would permit subsequent incineration without added fuel.

Incineration reduces the sludge volume to a minimum. The remaining ashes are sterile and can simply be discarded. State of the art incineration processes use both fresh activated sludge mostly requiring significant amounts of added fuel and also digested sludge.

The extra energy of the fuel additive is needed to incinerate digested sludge when the water content of the sludge cake is too high. Initial operation will, in any case, require added fuel. The considerable cost of the added fuel and energy make state of the art technology of incineration a rather costly process which can, however, not be done without in view of the present and future lack of landfill space.

According to German Federal Republic Pat. No. 3,429,055 a process for the disposal of sewage sludge is provided wherein a portion of the thick sludge is pre-dried to a predetermined dry matter content, and the remaining portion of thick sludge is incinerated as the dry product is continuously added.

German Federal Republic Pat. No. 2,916,216 relates a process for the reuse of sludge wherein the sludge is thickened, conditioned by addition of fine coal, fed to a filter press, and then incinerated.

The disadvantage inherent in the treatment of sludge in its preparation for incineration are only partly alleviated by the last mentioned processes.

DESCRIPTION OF THE INVENTION

An objective of the present invention is to minimize the costs of sludge disposal by providing a short reaction time and minimum use of chemicals. The product of the final treatment can be applied to land, or has a high calory fuel value.

The task of this invention is to develop a process to treat liquid organic substances, suitably sewage sludge, within an extremely short reaction time and by the use of enzymes and chelating agents so that their particle size and surface activities permit a biogenous flocculation and more easy separation of the solids from the liquid phase in a subsequent dewatering stage. The final product is to compost well by itself, or to be combustible at a high calorie fuel value.

According to the invention, the liquid organic matter to be treated is mixed in a manner known per se with from about 0.001% to about 0.1% by weight, based on the organic share of dry matter, of a chelating agent, suitably a salt of nitrilotriacetic acid, and with from about 0.001 to about 1.5% by weight of an enzyme or a mixture of enzymes for breaking down the organic components of the solids contained, and intensively aerated in a bioreactor. In this phase, the organic matter is broken down into sludge particles of smaller sizes and larger specific particle surfaces and higher surface activity. According to the invention, the process of breaking down the substances is discontinued when from about 30% to about 50% of the particles are smaller than $1\mu$, and from about 40% to about 70% of the particles are smaller than $5\mu$, and when the surface charge of the sludge particles is by from about 15 to about 30% higher than that of crude sludge. At this point, the sludge still has a high dispersion stability. This happens after a reaction time of from 0.5 to 20 hours. The mixture of substances thus treated is then subjected to a nonaerated postreaction phase of 5 to 15 hours in a downstream reactor. An open-topped post reaction vessel is provided for degasing. During this postreaction phase, biogenous flocculation of the surface active sludge particles takes place while the dispersion becomes destabilized. The postreaction phase must be stopped to optimize subsequent mechanical dewatering, when only from about 15% to about 20% of the particles are smaller than $1\mu$, and from about 30% to about 40% of the particles are smaller than $5\mu$, while the surface charge has become minimum. The remaining difference between the surface charge and the isoelectric point can be influenced by the addition of suitable inorganic substances further to reduce the polymeric flocculant requirement. This is followed by solid-liquid separation by means known per se, such as decanting centrifuges, or gravity thickeners.

It is possible to run the postreaction phase at higher temperatures between 20° C. and 38° C. or 45° C. and up to 75° C., to accelerate aggregation and to shorten the postreaction time. The temperature increase causes the surface tension to decrease, and thus will also accelerate degasing. Floc stability is raised at the same time. A partial flow of the mixture of substances to be treated can be drawn off prior to aeration and, be treated so that the own enzymes existing in the mixture are released, e.g. by means of a ball mill. This partial flow, will then also be fed into the aerobic reaction process for reducing the amount of enzymes that need to be added.

The conditioning process is much sped up by the addition of active agents such as enzymes and, chelating agents. In the course of the enzymatic transformation processes, only a part of the total biodegradable substance is eliminated, about 8%, as contrasted to about 30% in conventional sludge digestion, and from about 15% to about 20% in conventional enzymatic sludge stabilization.

The temperature range necessary for the conditioning process in the aerobic reactor (25° C. to 38° C.) is suitably reached by utilizing exothermic metabolic processes of the microorganisms contained in sludge. This requires the feeding of atmospheric oxygen by a proper gasifying device into the reactor, and constant recirculation of the contents of the reactor by appropriate delivery equipment such as centrifugal pumps. Alternatively, the aforementioned temperature range can be reached by feeding external energy into the aerobic reactor.

The preferred embodiments of the invention are described in the following illustrative examples.

EXAMPLE 1

Crude sludge from a municipal sewage plant and containing 4% solids is homogenized in a crude sludge storage tank. The crude sludge is then quasi-continuously fed into the aerobic conditioning reactor by a flexible tube equipped with an inductive flowmeter and a crude sludge feed pump. During this, 60 g of the triammonium salt of nitrilotriacetic acid, dissolved in about 30 l of tap water, are added. Furthermore, 60 g/m$^3$ of chelating agent-containing crude sludge of a complex enzyme preparation composed of $\beta$-glucanase, amylases, proteases and lipases is dissolved in about a 100 fold quantity of tap water and constantly fed in at certain doses. About a tenth of the crude sludge is treated in a ball mill prior to being fed into the aerobic conditioning reactor. There the enzymes contained in the sewage sludge are released leading to reduced needs of added enzymes. A high rate aerator continuously recirculates the sludge in the aerobic conditioning reactor and supplies oxygen.

A centrifugal pump is employed for supplementary recirculation in the case of discontinuous aeration. The crude sludge temperature is raised by exothermal metabolic processes of the sludge microorganisms from 20°C. to about 30° C. and remains approximately constant. The biological metabolic processes and the mechanical action of the high rate aerator result in a breakdown of organic substances into sludge particles of smaller size and thus higher specific surface.

The breakdown of the organic substances in the aerobic conditioning reactor does not result in their complete dissolution as it is the case in enzymatic sludge stabilization of the prior art. The process is discontinued after 4 hours. At this point, the reduced size sludge particles posses a high surface activity.

After the addition of cationic polymeric flocculation aids (e.g. Zetag 92, ACM/Federal Republic of Germany), the pretreated sludge is discharged from the aerobic conditioning reactor into an open top post-reaction tank where the sludge particles will aggregate intensively. Degasing is accelerated by recirculation and by a higher temperature of about 38° C. brought about by external heating. This will also accelerate the aggregation.

After a postreaction time of 10 hours, the treated sludge is dewatered in a mobile decanting centrifuge system. The solids separation efficiency is 97–99%. The sludge liquor produced contains less than 0.1% by weight of dry substance and is recirculated for reuse to the head of the sewage plant. The dewatered sludge has a dry matter content of about 32% by weight and hence a high calorie fuel value, a very fine particle size and low water absorption capacity. It is almost completely odorless. The high calorie fuel value permits its incineration without or with heavily reduced supply of additional fuel.

While attention needs to be paid to maximum permissible values of heavy metals, the dewatered sludge containing a high percentage of phosphorous and nitrogen can be directly applied to land, composted, or discarded.

EXAMPLE 2

The sewage is pretreated as in Example 1. The pretreated sludge is discharged into an open-topped postreaction tank. The high surface activity of the sludge particles brings about their reaggregation. Shear-stable agglomerates can form because of the fine primary particles created during the reaction phase. Degasing is accelerated by elevated temperature of about 38° C. from external heating. This also further accelerates the aggregation. After a reaction time of 10 hours, $FeCl_3$ primary flocculant is dosed into the sludge which is mixed with cationic polymeric flocculants, Zetag 92, ACM/FRG and dewatered mechanically, such as by a decanting centrifuge.

The solids separation efficiency is 97-99%. The sludge liquor produced contains less than 0.1% by weight of dry substance and is recirculated for reuse to the head of the sewage plant. The dewatered sludge has a dry matter content of about 32% by weight and hence a high calorie value, a very fine particle size and a low water absorption capacity. It is almost completely odorless. The high calorie value permits incineration without or with heavily reduced supply of external fuel.

While attention needs to be paid to maximum permissible values of heavy metals, the dewatered sludge containing a high percentage of phosphorus and nitrogen and can be directly applied to land, composted or discarded.

EXAMPLE 3

The sewage contains hard to decompose substituents and 3% solids and is pretreated as in Example 1. In case of discontinuous aeration, a centrifugal pump is employed for supplementary recirculation.

The crude sludge temperature is raised by the exothermal metabolic processes of the sludge microorganisms from 20° C. to about 50° C. within 20 hours. The biological metabolic process and the mechanical action of the high-rate aerator result in a breakdown of organic substance into sludge particles of smaller sizes and thus higher specific surfaces.

The sludge pretreated this way is discharged into an open-topped postreaction tank. The high surface activity of the sludge particles provokes their reaggregation. Shear-stable agglomerates can form because of the fine primary particles created during the reaction phase. By the supply of foreign energy, the pretreated sludge is heated to a constant 50° C. so that the aggregation and degassing will be accelerated.

After a reaction time of 15 hours, the sludge is mixed with Zetag 92 ACM/FRG cationic polymeric flocculant and is mechanically dewatered by a decanting centrifuge. The solids separation efficiency is 97-99%. The sludge liquor produced contains less than 0.1% by weight of dry substance and is recirculated for reuse to the head of the sewage plant. The dewatered sludge has a dry matter content of about 32% by weight and hence a high calorie value, a very fine particle size and a low water absorption capacity. It is almost completely odorless.

EXAMPLE 4

Liquid manure from a pig farm containing 6% solids is homogenized in a tank. The homogenized liquid manure is then quasi-continually fed into the aerobic conditioning reactor by way of a flexible tube equipped with an inductive flow meter and a crude sludge feed pump. During this, 60 g of the triammonium salt of nitrilotriacetic acid, dissolved in about 30 l of tap water are added. Furthermore, 60 $g/\mu_3$ of chelating agent-containing liquid manure of a complex enzyme preparation composed of $\beta$-glucanase, amylases, proteases and lipases are dissolved in about the 100 fold quantity of tap water and constantly fed in at certain doses. About a tenth of the liquid manure is treated in a ball mill prior to being fed into the aerobic conditioning reactor. There the enzymes originally in the manure are released leading to reduced need of added enzymes. A high-rate aerator continuously recirculates the manure in the conditioning reactor and supplies oxygen for ½ hour.

In case of discontinuous aeration, a centrifugal pump is employed for supplementary recirculation.

The temperature is raised by the exothermal metabolic processes of the manure microorganisms from 20° C. to about 30° C. and remains approximately constant. The biological metabolic processes and them mechanical action of the high-rate aerator result in a breakdown of organic substance into sludge particles os smaller sizes and thus higher specific surfaces. solved in about 30 l of tap water are added. Furthermore, 60g/$\mu_3$ of chelating agent-containing liquid manure of a complex enzyme preparation composed of $\beta$-glucanase, amylases, proteases and lipases are dissolved in about the 100 fold quantity of tap water and constantly fed in at certain doses. About a tenth of the liquid manure is treated in a ball mill prior to being fed into the aerobic conditioning reactor. There the enzymes originally in the manure are released leading to reduced need of added enzymes. A high-rate aerator continuously recirculates the manure in the conditioning reactor and supplies oxygen for ½ hour.

In case of discontinuous aeration, a centrifugal pump is employed for supplementary recirculation.

The temperature is raised by the exothermal metabolic processes of the manure microorganisms from 20° C. to about 30° C. and remains approximately constant. The biological metabolic processes and the mechanical action of the high-rate aerator result in a breakdown of organic substance into sludge particles of smaller sizes and thus higher specific surfaces.

The pretreated liquid manure is discharged into an open-topped postreaction tank. The high surface activity of the sludge particles brings about their reaggregation. Shear-stable agglomerates can form because of the fine primary particle created during the reaction phase. The sludge temperature is an average 25° C. After a reaction time of 5 hours, the manure sludge is mixed with Zetag 92 ACM/FRG cationic polymeric flocculant and is mechanically dewatered by a decanting centrifuge.

The solids separation efficiency is 97-99%. The sludge liquor produced contains less than 0.1% by weight of dry substance and is recirculated to the head of the sewage plant. The dewatered sludge has a dry matter content of about 32% by weight and hence a high calorie value, a very fine particle size, and a low water absorption capacity. It is almost completely odorless. The high calorie value permits incineration without or with heavily reduced amount of added fuel.

We claim:

1. A process for the enzymatic, aerobic conditioning of a liquid containing organic matter, comprising contacting in an aerobic reaction said liquid with from about 0.001% to about 0.1% wt. based on the organic matter content dry basis of said liquid of a chelating agent, and with from about 0.001% to about 1.5% wt. same basis of one or more enzymes adapted to break down said organic matter, aerating the resulting mixture, and terminating said aerobic reaction when from about 30% to about 50% wt. of the particles of said organic matter are smaller than 1μm, and from about 40% to about 70% wt. of the particles of said organic matter are smaller than 5μm, and subjecting said mixture to a nonaerated postreaction phase until from about 15% to about 20% wt. of said particles are smaller than 1μm, and from about 30% to about 40% wt. of said particles are smaller than 5μm, and then recovering the solids content of the mixture by separation of its liquid content.

2. The process of claim 1, wherein said chelating agent is a salt of nitrilotriacetic acid.

3. The process of claim 1, further comprising separating a part of the solids content of the liquid to be treated before or after the adding of the chelating agent, liberating enzymes in said solids, and returning said solids with said liberated enzymes, to the process.

4. The process of claim 1, further comprising adding one or more of conditioning agents, polymeric flocculants, and precipitants to the process before, during, and after said step of aerating.

5. The process of claim 1, further comprising heating by exothermic reaction heat and/or by added heat the reaction mixture after said step of aeration.

6. The process of claim 1, wherein the aerobic reaction takes place in from about 0.5 to about 20 hours.

7. The process of claim 1, wherein said postreaction phase takes place within from about 5 to about 15 hours.

8. The process of claim 1, wherein said postreaction phase is conducted at an elevated temperature of up to 75° C.

* * * * *